United States Patent

Colak

(10) Patent No.: US 8,857,458 B2
(45) Date of Patent: Oct. 14, 2014

(54) MECHANICAL EARTHQUAKE VALVE WITH ORIFICE SHUT OFF

(75) Inventor: Ibrahim Colak, Istanbul (TR)

(73) Assignee: Ibrahim Colak, Istanbul (TR)

( * ) Notice: Subject to any disclaimer, the term of this patent is extended or adjusted under 35 U.S.C. 154(b) by 42 days.

(21) Appl. No.: 13/394,096

(22) PCT Filed: Sep. 2, 2010

(86) PCT No.: PCT/TR2010/000175
§ 371 (c)(1),
(2), (4) Date: Mar. 26, 2012

(87) PCT Pub. No.: WO2011/028191
PCT Pub. Date: Mar. 10, 2011

(65) Prior Publication Data
US 2012/0174988 A1    Jul. 12, 2012

(30) Foreign Application Priority Data

Sep. 4, 2009 (TR) .............................. a 2009 06846

(51) Int. Cl.
*F16K 17/36* (2006.01)

(52) U.S. Cl.
CPC ...................................... *F16K 17/36* (2013.01)
USPC .................................. 137/38; 251/72; 251/74

(58) Field of Classification Search
USPC ........................... 137/38, 113; 251/66, 72, 74
See application file for complete search history.

(56) References Cited

U.S. PATENT DOCUMENTS

| | | | | |
|---|---|---|---|---|
| 2,615,461 A * | 10/1952 | Crow | ............................... | 137/39 |
| 3,805,818 A * | 4/1974 | Yamada | .......................... | 137/38 |
| 3,994,359 A * | 11/1976 | Smitley | ........................ | 180/282 |
| 4,103,697 A * | 8/1978 | Kiesow | .......................... | 137/45 |
| 4,513,629 A * | 4/1985 | Keller et al. | ........................ | 74/2 |
| 4,903,720 A * | 2/1990 | McGill | ............................ | 137/38 |
| 4,971,094 A * | 11/1990 | Gonzalez | ......................... | 137/38 |
| 5,078,172 A | 1/1992 | Gonzalez | | |
| 5,119,841 A * | 6/1992 | McGill | ............................ | 137/38 |
| 6,276,388 B1 * | 8/2001 | Kiryczun | ......................... | 137/45 |
| 6,527,004 B1 * | 3/2003 | Sibley et al. | ..................... | 137/38 |

FOREIGN PATENT DOCUMENTS

JP        60-116976 A    6/1985

OTHER PUBLICATIONS

International Search Report mailed Mar. 11, 2011.

* cited by examiner

*Primary Examiner* — Stephen M Hepperle
*Assistant Examiner* — R. K. Arundale
(74) *Attorney, Agent, or Firm* — Lowe Hauptman & Ham, LLP

(57) ABSTRACT

A mechanical earthquake valve which enables the supply of the fluid (gas) passing through itself to be automatically stopped and restarted owing to the sensor that detects the seismic movement resulting from an earthquake and which comprises the combined use of said sensor mechanism and at least one valve.

15 Claims, 2 Drawing Sheets

MECHANICAL EARTHQUAKE VALVE WITH ORIFICE SHUT OFF

RELATED APPLICATIONS

Figure 1:
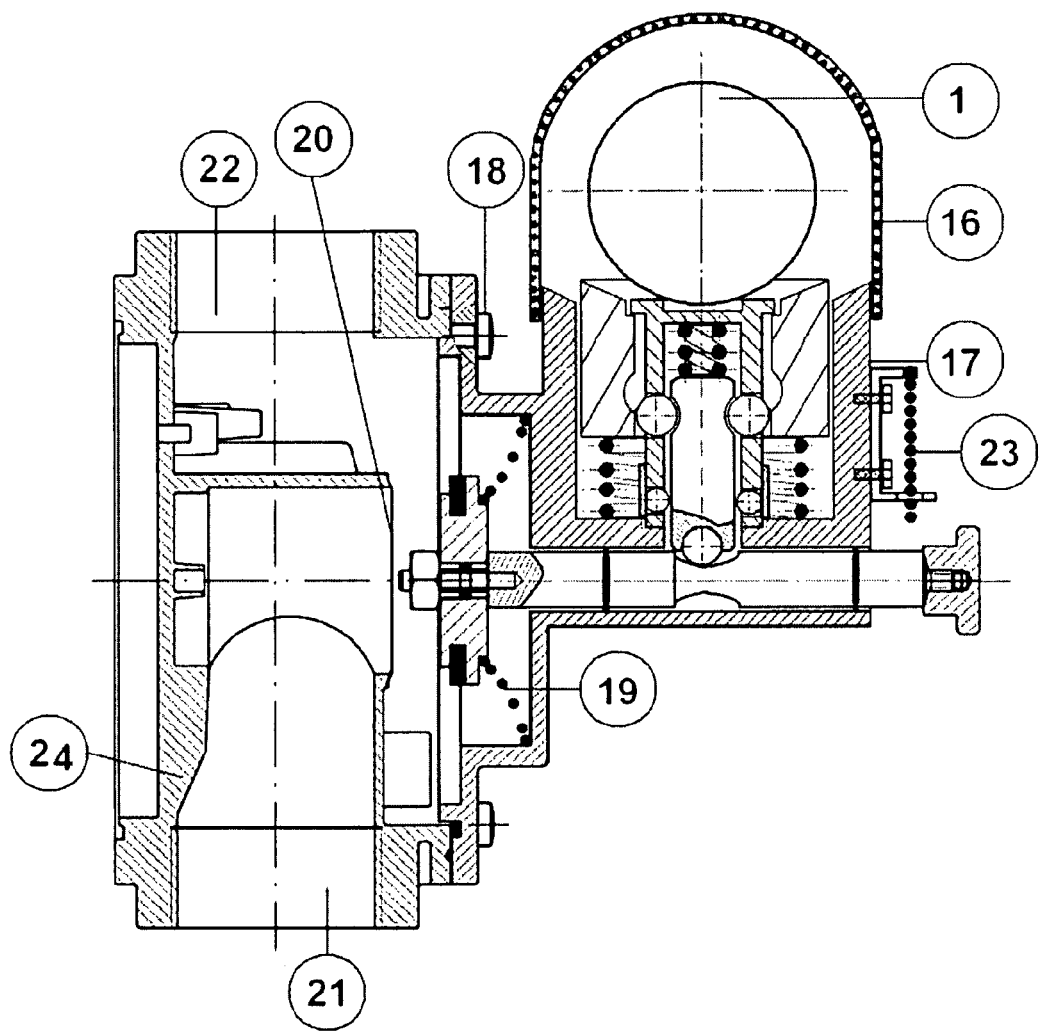

The present application is a National Phase of International Application Number PCT/TR2010/000175, filed Sep. 2, 2010, and claims priority from Turkish Application Number 2009/06846, filed Sep. 4, 2009.

TECHNICAL FIELD

The present invention relates to a mechanical earthquake valve, which enables the supply of the fluid (gas) passing through itself to be automatically stopped and restarted owing to the sensor that detects the seismic movement resulting from an earthquake and which comprises the combined use of said sensor mechanism and at least one valve.

BACKGROUND OF THE INVENTION

According to the state of art, such valve types are widely used in many countries situated in zones of increased seismic activity hosting intensive gas utilization. While the system most commonly used is the ball system.

An example of a ball system can be given as follows: due to the seismic movement, a ball falls into the gas passage effectively shutting off the gas flow. Such systems exhibit variations with respect to the ball diameter and weight and also to their way of use. However, in said systems, when the gas pipe gets damaged during an earthquake, said ball, even if it has blocked the gas passage, may come out of its housing and lead to gas leakage. This is the biggest and most significant problem of the ball systems.

Another system type includes those systems wherein the ball is located at a certain position as in the above example, said ball leaves its housing under the influence of the seismic movement to activate the system and as a result the gas flow is stopped.

Another type of device with mechanical sensor, which is currently in use, is the flap valve. Here the ball releases a tab, to which the flap is attached, from said flap and closes the flap by means of the spring force. In this system, assembly is performed horizontally.

Another known method involves the valves with magnetic flap retainer. These operate on the principle that the magnetic piece, which keeps the flap open, releases said flap as a result of the seismic movement and the flap stops the gas flow.

Other than those described above, there are electro-mechanical seismic gas stopper devices available in the market. It is a necessity for such devices to operate with a solenoid valve. The devices send a signal generated during an earthquake to the solenoid valve, and the solenoid enables the valve to be closed by means of a coil windings-bobbin. Battery feed is also necessary in this device type. These devices to become unable to serve their function when the battery is empty or when the electronic board fails. To enable their continued function, they must be subjected to periodical yearly maintenance. In addition, the cable connection between the electromechanical earthquake sensor and the solenoid valve is also a risk factor in said system. The effect of the ball in case of earthquake and the structure of the mechanism that blocks the gas is passage show differences from one another. In our country, the ball systems and the electronic seismic sensor devices are also used along with a solenoid valve in order to send the current to the electronic circuit during an earthquake.

In case said ball systems are used, the assembly should be done very carefully. In particular, a very precise approach is needed during balancing, because, in case the balancing is not given due attention, the system performs an early shutdown, thus having to close the valve unnecessarily. In this case, in order to restart the gas flow, the authorized personnel from the gas supply center should is to be called. This leads to increased work load for the gas distribution companies and to an unnecessary labor waste.

The present invention is the mechanical earthquake valve with orifice closure, comprising at least one valve and sensor mechanism, aimed to resolve the technical problems in the state of the art.

The technical drawings are provided in the enclosed pages in order to enable a better understanding of the system according to the invention, in which:

FIG. 1: A detailed view of the valve parts according to the invention.

Figure 2:
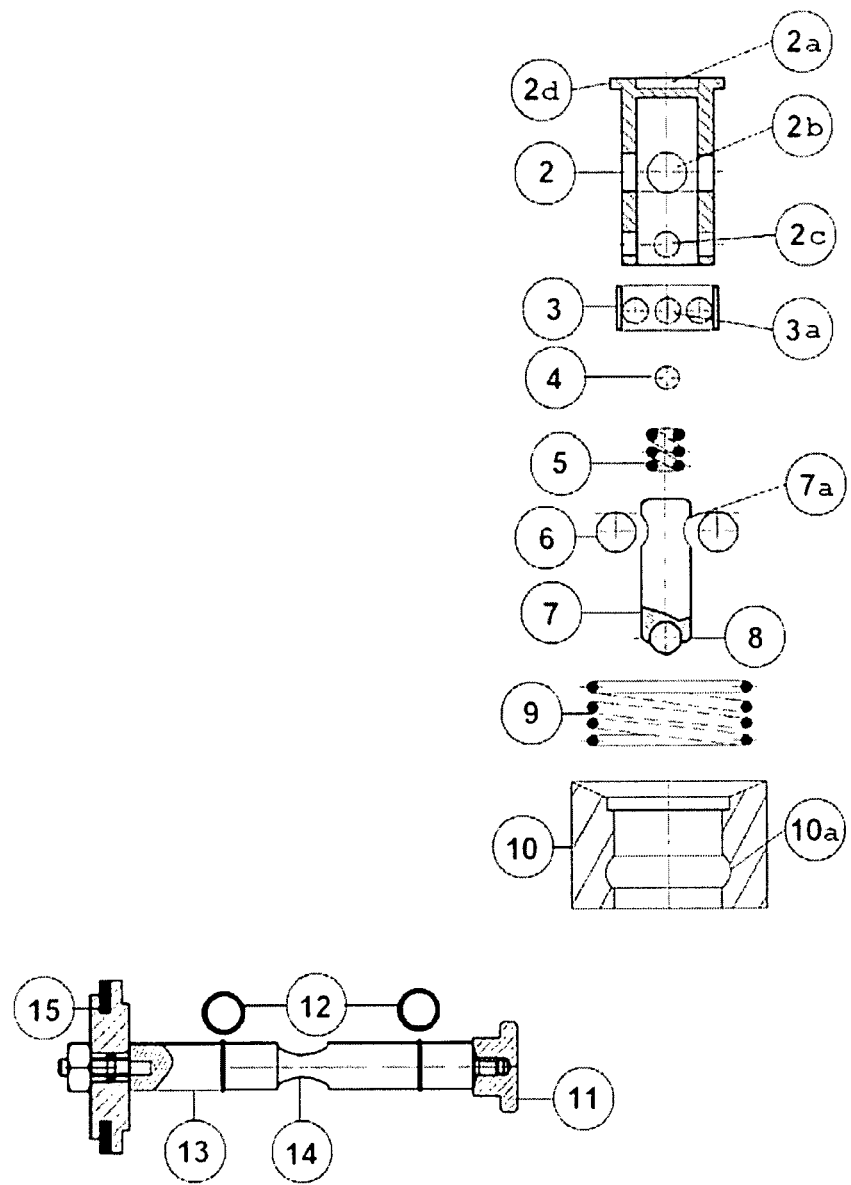

FIG. 2: Sectional view of the valve according to the invention.

REFERENCE NUMBERS TO AID IN THE DESCRIPTION OF THE INVENTION

1. Steel ball (½ inch, etc.)
2. Ball seating cylinder
   2a. Steel ball slot
   2b. Claw ball hole
   2c. Hole for motion rectifying ball
   2d. Seating cylinder rabbet
3. Motion rectifying cylinder
   3a. Slot for the motion rectifying ball
4. Motion rectifying ball
5. Push-down spring
6. Trigger ball
7. Claw pin
   7a. Trigger ball slot
8. Claw ball
9. Lifting spring
10. Trigger cylinder
    10a. Trigger ball slot
11. Spindle setup knob
12. Spindle seals o rings
13. Spindle
14. Spindle claw slot
15. Orifice closure rubber
16. Protective cover
17. Cover body-sensor mechanism
18. Screws
19. Orifice closure spring
20. Orifice surface
21. Gas inlet
22. Gas outlet
23. Plumb
24. Valve body

DESCRIPTION OF THE INVENTION

The present invention relates to a mechanical earthquake valve, which enables the supply of the fluid (gas) passing through itself to be automatically stopped and restarted owing to the sensor (17) that detects the seismic movement resulting from an earthquake and which comprises the combined use of said sensor mechanism (17) and at least one valve (24).

The sensor mechanism (17) used in the earthquake valve according to the invention may be substituted for the solenoid part of valves so called solenoid valve which fluid (gas)

passes through, it also enables the conversion of the valve's automatic fluid passage into a state in which the flow may be stopped under the influence of earthquake and then restarted. For this reason, the sensor mechanism (17), which is present within the earthquake valve according to the invention and detects the is earthquake, may also be used in different valves according to the fluid passing through the same.

The invention operates according to the main principle of the ball (1) moving as a result of the predetermined extent of seismic oscillation, the mechanism inside the cover body (17) transmitting this movement to the claw ball (8), the spindle (13) becoming released from the claw ball (8) retaining the same, and upon pushing by the orifice closure spring (19), the orifice closure rubber (15) covering the orifice surface (20), thus stopping the gas flow.

To put it in more detail, the steel ball (1), which is protected by the protective cover (16) fitted to the cover body (17), stands (seats) in balance within the steel ball slot (2a) on the ball seating cylinder (2). The balancing of the system is provided by means of the plumb (23) fitted to the body (17).

The ball seating cylinder (2) has the ball seating slot (2a), at least 4 claw ball holes (2b) and at least 4 holes (2c) for the motion rectifying ball. It is hollow on the inside, in order to enable the entry of the spindle (13) claw pin (7) and the push-down spring (5). The cover is secured to the body (17). It is surrounded by the motion rectifying cylinder (3) and the trigger cylinder (10).

There is present the claw ball (8), which retains the spindle (13), freely rotating within its slot at the end of the claw pin (7).

The trigger cylinder (10), fulfilling the function of triggering within the system, is embedded into the cover body (17). It is lifted by the lifting spring (9) up to the seating cylinder rabbet (2d). Meanwhile, the trigger ball (6) centers the claw ball hole (2b) and remains in a compressed state in the trigger ball slot (7a) and in the space between the trigger cylinder (10). Upon being pressed by the ball (1), the trigger cylinder (10) moves downwards. The trigger ball (6) enters its slot (10a). Meanwhile, the claw pin (7), which moves upwards upon being pushed along the vertical axis by the resultant force of the spindle (13), which has overcome the pressing force of the push-down spring (5), seats the trigger ball (6) in its slot (10a) on the trigger cylinder (10). The spindle, which is thus released, slides within its slot on the body (17) and covers the orifice (20). On the spindle (13), there are present the spindle claw slot (14), gas sealing o-rings (12), setup knob (11) and the orifice closure rubber (15).

When the spindle setup knob (11) is pulled backwards and is kept in pulled state for a few seconds, the claw ball (8) is pushed under the effect of the push-down spring (5) in a compressed state and fits into the spindle claw slot (14), thus the system is reset and the balls return to their original positions.

The motion rectifying cylinder (3) prevents the escape of the motion rectifying balls (4). Said balls (4) enable the claw pin (7) to move up and down along the vertical axis in a problem-free manner.

The mechanism (17) detecting the earthquake may also be used in different valve bodies (24) according to the fluid passing through the same. The operation of the system may be adjusted in various acceleration assemblies.

The invention claimed is:

1. An earthquake valve comprising:
    a valve body; and
    a sensor mechanism configured to detect seismic movement, the sensor mechanism comprising:
        a protective cover,
        a steel ball protected by the protective cover,
        a hollow, ball seating cylinder embedded to a cover body and configured to support the steel ball,
        a motion rectifying cylinder,
        at least one motion rectifying ball,
        at least one trigger ball,
        a push-down spring positioned within the hollow, ball seating cylinder,
        a claw pin positioned within the hollow, ball seating cylinder and under the push-down spring,
        a lifting spring positioned around the hollow, ball seating cylinder,
        a trigger cylinder positioned above the lifting spring,
        a claw ball positioned below the claw pin,
        a spindle positioned below the claw pin, and
        a plumb,
    wherein the sensor mechanism is configured to transmit movement of the steel ball into downward movement of the trigger cylinder, upward movement of the claw pin, and lateral movement of the spindle to effect valve closure, and
    wherein the trigger cylinder comprises a first trigger ball slot, the claw pin comprises a second trigger ball slot, and the spindle comprises a spindle claw slot.

2. The earthquake valve according to claim 1 wherein, within a valve portion that blocks gas passage, an end of the spindle extending from the sensor mechanism comprises an orifice closure rubber.

3. The earthquake valve according to claim 2 wherein the orifice closure rubber is configured to cover an orifice surface to stop gas flow upon being pushed by an orifice closure spring.

4. The earthquake valve according to claim 1, the spindle comprising at least one spindle seal o ring, a spindle setup knob, and an orifice closure rubber.

5. The earthquake valve according to claim 1 wherein the trigger cylinder is configured to be lifted by the lifting spring up to a rabbet on the hollow, ball seating cylinder and to serve the function of triggering.

6. The earthquake valve according to claim 1 wherein the hollow, ball seating cylinder comprises at least one ball hole and the at least one trigger ball positioned in the ball hole and the second trigger ball slot corresponds to an open valve state.

7. The earthquake valve according to claim 1 wherein the sensor mechanism is further configured so that, upon being pressed by the steel ball, the trigger cylinder moves downwards and the claw pin moves upwards along a vertical axis by a resultant force of the spindle, which overcomes a pressing force of the push-down spring and compresses the push-down spring, the upward positioning of the claw pin corresponding to seating the at least one trigger ball in the first trigger ball slot.

8. The earthquake valve according to claim 1 wherein the spindle is configured to be released upon upward movement of the claw ball from a position within the spindle claw slot to slide from a slot on the sensor mechanism body and cover a valve orifice.

9. The earthquake valve according to claim 1 wherein the spindle comprises a spindle setup knob and the sensor mechanism is further configured such that, when the spindle setup knob is pulled away from the sensor mechanism body, the claw ball is pushed under the effect of the push-down spring in a compressed state and fitted into the spindle claw slot, thereby enabling the steel ball and the at least one trigger ball to return to positions corresponding to an open valve state.

10. The earthquake valve according to claim 1 wherein the motion rectifying cylinder is configured to prevent escape of the at least one motion rectifying ball and to allow the at least one motion rectifying ball to enable the claw pin to move up and down along a vertical axis.

11. An earthquake sensor mechanism configured to detect seismic movement, the sensor mechanism comprising:
   a protective cover,
   a steel ball protected by the protective cover,
   a hollow, ball seating cylinder embedded to a cover body and configured to support the steel ball,
   a motion rectifying cylinder,
   at least one motion rectifying ball,
   at least one trigger ball,
   a push-down spring positioned within the hollow, ball seating cylinder,
   a claw pin positioned within the hollow, ball seating cylinder and under the push-down spring,
   a lifting spring positioned around the hollow, ball seating cylinder,
   a trigger cylinder positioned above the lifting spring,
   a claw ball positioned below the claw pin,
   a spindle positioned below the claw pin, and
   a plumb,
wherein the sensor mechanism is configured to transmit movement of the steel ball into downward movement of the trigger cylinder, upward movement of the claw pin, and lateral movement of the spindle to effect triggered spindle movement, and
wherein the trigger cylinder comprises a first trigger ball slot, the claw pin comprises a second trigger ball slot, and the spindle comprises a spindle claw slot.

12. The earthquake sensor mechanism according to claim 11 wherein the hollow, ball seating cylinder comprises at least one ball hole and the at least one trigger ball positioned in the ball hole and the second trigger ball slot corresponds to an open valve state.

13. The earthquake sensor mechanism according to claim 11 wherein the sensor mechanism is further configured so that, upon being pressed by the steel ball, the trigger cylinder moves downwards and the claw pin moves upwards along a vertical axis by a resultant force of the spindle, which overcomes a pressing force of the push-down spring and compresses the push-down spring, the upward positioning of the claw pin corresponding to seating the at least one trigger ball in the first trigger ball slot.

14. The earthquake sensor mechanism according to claim 11 wherein the spindle comprises a spindle setup knob and the sensor mechanism is further configured such that, when the spindle setup knob is pulled away from the sensor mechanism body, the claw ball is pushed under the effect of the push-down spring in a compressed state and fitted into the spindle claw slot, thereby enabling the steel ball and the at least one trigger ball to return to positions corresponding to an untriggered state.

15. The earthquake sensor mechanism according to claim 11 wherein the motion rectifying cylinder is configured to prevent escape of the at least one motion rectifying ball and to allow the at least one motion rectifying ball to enable the claw pin to move up and down along a vertical axis.

* * * * *